US009481859B2

(12) United States Patent
Noordman et al.

(10) Patent No.: US 9,481,859 B2
(45) Date of Patent: *Nov. 1, 2016

(54) METHOD OF STABILIZING YEAST FERMENTED BEVERAGES (75) Inventors: Tom Reinoud Noordman, Oegstgeest (NL); Marcel Van Der Noordt, Middleharnis (NL); Anneke Richter, Leiden (NL)

(73) Assignee: Heineken Supply Chain B.V., Zoeterwoude (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/811,229

(22) PCT Filed: Jul. 18, 2011

(86) PCT No.: PCT/NL2011/050523
§ 371 (c)(1),
(2), (4) Date: Mar. 29, 2013

(87) PCT Pub. No.: WO2012/011807
PCT Pub. Date: Jan. 26, 2012

(65) Prior Publication Data
US 2013/0183403 A1 Jul. 18, 2013

(30) Foreign Application Priority Data
Jul. 22, 2010 (EP) .................................... 10170389

(51) Int. Cl.
C12H 1/056 (2006.01)
B01D 41/02 (2006.01)
B01D 15/00 (2006.01)
B01J 20/26 (2006.01)
B01J 20/34 (2006.01)

(52) U.S. Cl.
CPC .............. *C12H 1/0424* (2013.01); *B01D 15/00* (2013.01); *B01D 41/02* (2013.01); *B01J 20/261* (2013.01); *B01J 20/267* (2013.01); *B01J 20/3425* (2013.01); *B01J 20/3475* (2013.01)

(58) Field of Classification Search
CPC .... C12H 1/0424; C12H 1/063; C12H 1/061; C12H 1/02; C12H 1/04; C12H 1/0408; C12H 1/0416; C12H 1/22; B01D 41/02; B01D 2321/164; B01J 20/26
USPC ........ 426/330.4, 422, 330.3, 330.5, 16, 590, 426/592, 12, 490, 495, 11; 210/691, 660, 210/670, 692, 500.41, 502.1, 651, 653, 690, 210/193, 254, 269, 500.21, 500.23, 500.27, 210/500.34, 500.35, 500.37, 500.42, 503, 210/506, 615, 635, 636, 639, 650, 654, 669, 210/741, 758, 777, 778, 792, 797, 798, 806
See application file for complete search history.

(56) References Cited

U.S. PATENT DOCUMENTS 5,262,053 A * 11/1993 Meier ........................... 210/636
5,801,051 A 9/1998 Kiefer et al.
6,117,459 A 9/2000 Van Den Eynde et al.
2005/0279374 A1 12/2005 McGrath et al.
2009/0291164 A1 11/2009 Meffert et al.
2010/0062104 A1 3/2010 Schneid

FOREIGN PATENT DOCUMENTS

| EP | 0 551 245 A1 | 7/1993 |
| GB | 2 288 608 A | 10/1995 |
| WO | WO-99/13048 A2 | 3/1999 |
| WO | WO-99/16531 A1 | 4/1999 |
| WO | WO-99/47636 A2 | 9/1999 |
| WO | WO-99/60090 A1 | 11/1999 |
| WO | WO-02/102960 A1 | 12/2002 |
| WO | WO-2010/052130 A2 | 5/2010 |

OTHER PUBLICATIONS

Database FSTA [Online] International Food Information Service (IFIS), Frankfurt-Main, DE; Dahmus M. et al: "PVPP-treatment and regeneration in a whirlpool. (translated) TIOL-PVPP Behandlund und Regeneration im Whirlpool.", XP002614802, Database accession No. FS-1989-12-H-0006. Abstract.
Database FSTA [Online] International Food Information Service (IFIS), Frankfurt-Main, DE; Dahmus M. et al: "PVPP-treatment and Regeneration in a whirlpool. (translated) TIOL-PVPP Behandlund und regeneration im Whirlpool.", XP002614802, Database accession FS-1989-12-H-0006, Abstract.
International Preliminary Report on Patentability for PCT/NL2011/050522—mailed Sep. 7, 2012.
International Preliminary Report on Patentability for PCT/NL2011/050523—mailed Jul. 16, 2012.
International Search Report for PCT/NL2011/050522—mailed Oct. 4, 2011.
International Search Report for PCT/NL2011/050523—mailed Nov. 10, 2011.
International Search Report for PCT/NL2011/050524—mailed Nov. 10, 2011.
Rehmanji, M. et al: "Beer Stabilization Technology—Clearly a Matter of Choice", Master Brewers Association of the Americas Tech Quarterly, vol. 42, No. 4, 2005, pp. 332-338, XP002614522.

* cited by examiner

*Primary Examiner* — Vera Stulii
(74) *Attorney, Agent, or Firm* — Foley & Lardner LLP; Sunit Talapatra (57) ABSTRACT

A method of preparing yeast fermented beverage is provided, comprising (a) fermenting wort with yeast to produce a fermented liquid containing yeast, alcohol, polyphenols and protein; (b) optionally removing the yeast; (c) combining the fermented liquid with polyvinylpolypyrrolidone (PVPP) particles to bind at least a fraction of the polyphenols and/or proteins, wherein at least 80 wt. % of the PVPP particles have a diameter of 5-300 μm; (d) removing a slurry containing the PVPP particles; (e) filtering the slurry over a filter having a pore size of 0.1-80 μm to produce a PVPP-enriched retentate and a PVPP-depleted filtrate; (f) regenerating the PVPP particles in the PVPP-enriched retentate by desorbing and separating the polyphenols and/or protein from the PVPP-particles; and (f) optionally, further refining and recirculating the regenerated PVPP particles to step (c). The method can be operated with single use PVPP or regenerable PVPP and does not require capacious filter hardware.

19 Claims, 5 Drawing Sheets

METHOD OF STABILIZING YEAST FERMENTED BEVERAGES

CROSS-REFERENCE TO RELATED APPLICATIONS

This application is the National Phase of International Patent Application No. PCT/NL2011/050523, filed Jul. 18, 2011, published as WO 2012/011807, which claims priority to European Application No. 10170389.0, filed Jul. 22, 2010. The contents of these applications are herein incorporated by reference in their entirety.

TECHNICAL FIELD OF THE INVENTION

The present invention relates to a method of stabilising yeast fermented beverages. More particularly, the present invention provides a method of stabilising yeast fermented beverages by combining a yeast fermented liquid with polyvinylpolypyrrolidone (PVPP) particles to bind at least a fraction of the polyphenols and/or the proteins contained in the fermented liquid to said PVPP particles; removing a slurry containing the PVPP particles from the fermented liquid; and regenerating the PVPP particles.

BACKGROUND OF THE INVENTION

Yeast fermented beverages, such as beer, are stabilised to ensure that the beverage tastes and looks as good at the end of its shelf life as it did after packaging. Since a consumer's first evaluation is a visual one, clarity is taken as a determining measure of beer quality. With a few notable exceptions, consumers expect a bright, appealing product, which is free from haze.

Colloidal haze in beer arises from the formation of polyphenol-protein complexes during storage. Fresh beer contains acidic proteins and a variety of polyphenols. Whilst these can form complexes via loose hydrogen bonding, their low molecular weight means that they are too small to be visible to the naked eye. As these small polyphenols, termed flavanoids, polymerise and oxidise, they produce short chain (condensed) polyphenols termed tannoids. These tannoids are capable of bridging across a number of proteins through hydrogen bonding to form reversible chill haze. After further storage, stronger ionic and covalent bonds form between the tannoids and proteins resulting in irreversible permanent haze. The rate and extent to which this occurs is impacted by the brewing materials, process and storage conditions and can be greatly improved (reduced) by the use of stabilisation aids.

Since the rate-determining factor in the development of haze is the change in the polyphenol fraction, reducing the levels of these haze precursors is a very efficient method of ensuring the colloidal stability of beer. Polyvinylpolypyrrolidone (PVPP) is a cross-linked polymer of (poly)vinylpyrrolidone that is insoluble in water. Highly porous PVPP particles are used in the brewing industry for adsorption of haze polyphenols. PVPP selectively complexes haze polyphenols, predominantly through very strong hydrogen bonding, with multiple attachment sides for haze polyphenols. The molecular structure of the PVPP polymer limits internal hydrogen bonding, maximising the number of available reactive sites.

PVPP stabilisers are either optimised for single use, where they are added to the beer stream and removed on the kieselguhr filter or, for regeneration grades, added to bright beer using dedicated filtration units and recycled for reuse.

In either mode many of the initial handling characteristics are common. The PVPP powder is slurried in the dosing tank using softened de-aerated water at a concentration of around 8-12% (wt./vol.). The material must be stirred for at least 15 minutes to swell and hydrate the particles. The slurry should then be kept under constant agitation to prevent settling. In the case of regeneration grades, the stabiliser dosing tank is often maintained at 80° C. to ensure long-term microbial stability.

The most common method of adding single use PVPP is by continuous dosing to the beer stream using a proportioning pump. Although PVPP can be very effective with short contact times, a contact time of 5-10 minutes between the point of addition and removal of the spent PVPP on the kieselguhr filter is recommended for maximum efficiency. PVPP should be added to cold beer, at or below 0° C., to prevent re-dissolution of those polyphenol-protein complexes that have already formed.

The principle of regenerable PVPP use is to break the PVPP-polyphenol bonds through washing the material with a caustic (NaOH) solution. Regeneration is considered to be economic if a brewery stabilises a large output volume and/or the beer being stabilised has an extremely high polyphenol content, that would require high addition rates of PVPP for effective colloidal stabilisation. Regeneration grades of PVPP are specifically manufactured to produce particles of larger size and greater mechanical strength, which still give effective polyphenol reduction. Horizontal leaf filters were the original designs for using and regenerating PVPP, but candle filters are also now entering service.

The initial preparation of regeneration grades of PVPP is very similar to that of the single use product. A dedicated slurry tank is required, often equipped with a heating jacket. The empty filter is first purged with $CO_2$ and a pre-coat of regenerable PVPP of about 1-2 mm in depth is deposited on the filter screens of. The stabiliser slurry is recirculated around the filter till the water at the sight glass or measuring point is clear. PVPP is dosed into the now incoming beer stream using a proportioning pump. The effective stabilisation run is completed when the space between the filter plates is filled with PVPP. The final volume of beer stabilised depends on the size of the filter, PVPP charge and the addition rate into beer and can run to several thousand hl.

At the end of the filtration and stabilisation, residual beer is returned to the beer recovery tank. The used PVPP is regenerated by circulating a caustic (1-2% wt/wt) solution, at 60-80° C. through the PVPP filter bed for between 15-30 minutes. Sometimes, a second caustic rinse is used, with the first cycle run to drain and the second cycle saved for re-use as the first caustic rinse at the next regeneration. The colour of the caustic leaving the filter is very dark, confirming the breakage of the strong PVPP-polyphenol complexes. The PVPP filter cake is then flushed with hot water at 80° C. to displace the caustic solution and reduce pH. This is followed by a rinse cycle with dilute acid until the solution leaving the filter reaches around pH 4 over 20 minutes. Residues from the beer and water are effectively removed and best results are achieved by pre-heating the dilute acid to around 60° C. The filter is then flushed with cold water until the acid is washed out and the pH at the outlet is neutral. Finally $CO_2$, water and the centrifugal force of spinning the filter elements are used to displace the regenerated PVPP from the filter screens to the dosing pot. The solids (PVPP) content in the dosing tank is checked and new material added to make up for process losses. These losses are typically between 0.5-1% per regeneration. However, it is the cost of the capacious filter hardware, rather than that of the PVPP stabiliser, that has a more significant influence on the economics of PVPP regeneration.

Thus, whereas single use PVPP has the disadvantage that it generates a considerable waste stream, regenerable PVPP suffers from the drawback that it requires a considerable upfront investment in sophisticated filter hardware.

WO 99/16531 describes a process for the regeneration of spent filter media that has been used in mechanical filtration of beer and that contains perlite and PVPP. The regeneration process disclosed in WO 99/16531 comprises the following steps:
- adding an aqueous liquid comprising about 0.25 to 3.0 weight percent caustic to a regeneration vessel containing a filter cake comprising a filter media and filtrates;
- stirring the contents of the regeneration tank for a time not exceeding 18 hours at a temperature not exceeding about 110° F. (43.3° C.);
- substantially removing the aqueous liquid from the filter media;
- rinsing the filter media with a caustic solution;
- rising the filter media with an acid solution; and
- rinsing the filter media with water.

US 2009/0291164 describes a process for regenerating a PVPP-containing filter aid comprising:
(i) providing a filter aid comprising a co-extrudate of a PVPP and a thermoplastic polymer;
(ii) treating the filter aid with aqueous alkali;
(iii) subsequently treating the filter aid with an enzyme; and
(iv) subsequently thereto carrying out a second treatment with aqueous alkali.

U.S. Pat. No. 6,117,459 describes a method of regenerating a filtration adjuvant comprising synthetic polymer or natural grains, the adjuvant being charged with organic impurities which includes yeasts and which are trapped in the cavities between the adjuvant grains after filtering a liquid charged with said impurities, and being deposited on a filtration support of a filtration installation, the method including the steps of:
- washing the filtration adjuvant with a soda solution at a temperature of at least 80° C. for 60-120 minutes;
- carrying out the washing step in situ with said soda solution by passing the soda solution through the filtration installation in the washing direction identical to the direction of the liquid to be filtered;
- passing through the filtration installation in the washing direction an enzyme composition at a temperature between 40 and 60° C. for between 100 and 200 minutes, said enzyme composition including agents capable of lysing yeasts;
- washing said filtration adjuvant to eliminate therefrom the organic impurities waste product, said washing step being a second washing with a soda solution to eliminate waste products produced by the enzymatic composition passing step; and
- removing grains of the adjuvant accumulated on the filtration support to clean said filtration support and to use said grains of adjuvant for a new filtration operation.

The Example of this US patent describes the filtration a Pils type beer containing $10^6$ yeasts/ml and to which was added a mixture of 200 g/hl of RILSAN® (Nylon 11) and 50 g/hl PVPP on a plate filter onto which a layer of RILSAN® and PVPP had been predeposited. The regeneration treatment performed on the filter mass in the filtration rig without demounting.

The above mentioned regeneration methods have in common that PVPP-regeneration relies on the degradation of yeast cells by treatment with caustic solution and/or enzymolysis and on the subsequent elimination of the degraded yeast material.

SUMMARY OF THE INVENTION

The present inventors have developed an improved method of stabilising yeast fermented beverages by treatment with PVPP particles and regeneration of said used PVPP-particles for re-use. The method according to the present invention can be operated with single use PVPP as well as regenerable PVPP. Furthermore, the present method does not require capacious filter hardware for regenerating the PVPP.

In the method of the present invention PVPP particles are added to the yeast fermented liquid prior to clarification. Next, a slurry containing PVPP particles is removed from the fermented liquid and filtered over a filter having a pore size in the range of 0.1-80 μm to produce a retentate containing PVPP particles. Subsequently, the PVPP particles contained in the retentate are regenerated by desorbing polyphenols and/or protein from said PVPP-particles and by separating the desorbed polyphenols and/or the desorbed protein from the PVPP particles. Finally, after optional further refining of the regenerated PVPP particles, the regenerated particles are reused in the method.

More particularly, the present invention provides a method of preparing a yeast fermented beverage, said method comprising the steps of:
a. fermenting wort with a biologically active yeast to produce a fermented liquid;
b. optionally removing yeast from the fermented liquid (e.g. by centrifugation);
c. combining the fermented liquid with polyvinylpolypyrrolidone (PVPP) particles to bind at least a fraction of the polyphenols and/or the proteins contained in the fermented liquid;
d. removing a slurry containing the PVPP particles from the fermented liquid;
e. filtering the removed slurry over a filter having a pore size in the range of 0.1-80 μm to produce a PVPP-enriched retentate and a PVPP-depleted filtrate;
f. regenerating the PVPP particles contained in the retentate by desorbing polyphenols and/or protein from said PVPP-particles and separating the desorbed polyphenols and/or the desorbed protein from the PVPP particles; and
g. after optional further refining of the regenerated PVPP particles, recirculating the regenerated PVPP particles to step c.

The filtering of the removed slurry over a filter having a pore size in the range of 0.1-80 μm offers the important advantage that it enables PVPP particles to be separated from the smaller yeast cells prior to the regeneration of the PVPP particles. Thus, the PVPP particles contained in the retentate can be regenerated without difficulty and the regenerated PVPP particles retain their high affinity for polyphenols and proteins even after multiple regeneration cycles. The present method also offers the benefit that the recycling of the PVPP particles can be carried out in relatively simple and small-sized equipment.

DETAILED DESCRIPTION OF THE INVENTION

Accordingly, the present invention relates to a method of preparing a yeast fermented beverage, said method comprising the steps of:
a. fermenting wort with a biologically active yeast to produce a fermented liquid containing yeast, alcohol, polyphenols and protein;
b. optionally removing yeast from the fermented liquid;
c. combining the fermented liquid with polyvinylpolypyrrolidone (PVPP) particles to bind at least a fraction of the polyphenols and/or the proteins contained in the fermented liquid to said PVPP particles, at least 80 wt. % of said PVPP particles having a diameter in the range of 5-300 µm;
d. removing a slurry containing the PVPP particles from the fermented liquid;
e. filtering the slurry over a filter having a pore size in the range of 0.1-80 µm to produce a PVPP-enriched retentate and a PVPP-depleted filtrate;
f. regenerating the PVPP particles contained in the PVPP-enriched retentate by desorbing polyphenols and/or protein from said PVPP-particles and separating the desorbed polyphenols and/or the desorbed protein from the PVPP particles; and
g. after optional further refining of the regenerated PVPP particles, recirculating the regenerated PVPP particles to step c.

The term "wort" as used herein refers to the liquid extracted from the mashing process during the brewing of e.g. beer or whisky. Wort contains sugars, derived from a grain source, such as malt, that are fermented by the brewing yeast to produce alcohol, flavour etc.

The terms PVPP-enriched retentate and PVPP-depleted filtrate are used to indicate that the retentate comprises more PVPP particles than the filtrate, although the filtrate may still comprise some PVPP particles.

Whenever reference is made herein to the binding/desorption of polyphenols and/or the proteins to/from PVPP particles what is meant is that polyphenols or protein are bound to or desorbed from the PVPP-particles as such or as part of complexes of e.g. (polymerised) polyphenols and proteins.

In one embodiment of the present method, no yeast is removed from the fermented liquid before it is combined with the PVPP particles. In accordance with this embodiment, the fermented liquid containing the PVPP particles typically comprises yeast in a concentration of at least 5 mg of wet yeast per kg of fermented liquid. More preferably said yeast concentration lies within a range of 10-10,000 mg of wet yeast per kg of fermented liquid, most preferably within a range of 50-10,000 mg of wet yeast per kg of fermented liquid.

In an alternative embodiment of the present method yeast is removed from the fermented liquid before said liquid is combined with the PVPP particles. Yeast may suitably be removed at this stage of the method by means of sedimentation, such as settling or centrifugation, centrifugation being preferred. In accordance with this embodiment, the yeast content of the fermented liquid after the yeast removal does not exceed 50 mg of wet yeast per kg of fermented liquid, more preferably it does not exceed 5 mg of wet yeast per kg of fermented liquid. The amount of wet yeast contained in a fermented liquid may suitably be determined by a standard consistency measurement, i.e. taking a weighted amount of sample from the fermentation liquid, next centrifuge this and decant the supernatant and finally measure the weight of the centrifuged pellet.

Typically, in the present method the PVPP-particles are combined with the fermented liquid in a weight ratio of 1:100,000 to 1:100, more preferably in a weight ratio of 1:30,000 to 1:1000.

In the present method, the combining of the fermented liquid and the PVPP particles is suitably achieved by mixing the fermented liquid with the PVPP particles.

The slurry that is removed from the fermented liquid preferably contains at least 0.1 g/l, more preferably 1-200 g/l of the PVPP particles.

It is further preferred that at least 95 wt. % of the wetted PVPP particles contained in the slurry have a density of less than 1.2 g/ml, preferably of 1.0-1.1 g/ml.

In the present method, the slurry that is removed from the fermented liquid may be filtered as such, or alternatively, the slurry may be pre-diluted prior to filtration, e.g. by combining the slurry with a caustic regeneration liquid. Typically, the slurry that is filtered has a solids content in the range of 0.5-300 g/l, more preferably of 1-200 g/l and most preferably of 10-200 g/l.

The slurry containing the PVPP particles may be removed from the fermented liquid using different solid-liquid separation techniques. Preferably, said slurry is removed from the fermented liquid by means of filtration. Examples of filters that may suitably be used to remove the slurry from the fermented liquid include membrane filters, sheet filters and kieselguhr filters. According to a particularly preferred embodiment of the present method, the slurry is removed from the fermented liquid by means of membrane filtration. Membrane filtration offers the advantage that it enables the recovery and regeneration of PVPP-particles in very high yields.

Membrane filtration may suitably be employed in the present method not only to remove PVPP particles from the fermented liquid, but also to remove yeast and other haze-forming components. Thus, in accordance with a preferred embodiment, the filtrate obtained from the membrane filter is a clear, clarified liquid, notably clarified beer. The aforementioned membrane filter typically has a pore-size in the range of 0.1-5 µm, more preferably of 0.2-1 µm.

In case the present method employs a membrane filter to remove the slurry, it is preferred not to employ a filter aid, other than PVPP particles.

As explained herein before, the present method can be carried out using single use PVPP particles as well as regenerable PVPP particles. Typically, these PVPP particles have a mass weighted average diameter of 10-300 µm. In accordance with one embodiment of the present invention, the method employs single use PVPP particles having a mass weighted average diameter of 10-60 μm, more preferably of 12-50 μm. According to another embodiment, the present method employs regenerable PVPP particles having a mass weighted average diameter of 30-300 μm, more preferably of 40-200 μm.

The PVPP particles used in the present method typically have a specific surface area of more than 0.1 m²/g. More preferably, the specific surface area of the PVPP particles lies within the range of 0.15-5 m²/g.

According to a preferred embodiment, the filter used for filtering the slurry has a pore-size of not more than 80 μm, particularly preferred not more than 60 μm, even more preferably of not more than 50 μm.

In case single use PVPP particle are used a filter having a pore-size of not more than 40 μm, preferably not more than 30 μm, may suitably be used. The pore-size of the filter typically is at least 1 μm, even more preferably at least 5 μm. Most preferably, said filter has a pore-size of at least 10 μm. The use of a filter having a pore-size of 10 μm or more offers the advantage that most yeast cells are able to pass through these pores. Thus, the filtering of the slurry can advantageously be used to produce a PVPP-enriched retentate that contains not more than a limited amount of yeast.

Typically, at least 50 wt. %, more preferably at least 70 wt. % and most preferably at least 90 wt. % of the yeast contained in the slurry passes through the filter to end up in the PVPP-depleted filtrate.

Examples of filters that may suitably be used to filter the slurry include sheet filters, disk filters and candle filters.

An important advantage of the present method lies in the fact that the filtration of the slurry can be carried on a relatively small filter unit. In this respect, the present method clearly differs from the methods currently used in the brewing industry for recovering regenerable PVPP. In these existing methods large filter units are employed as the total volume of clarified beer has to pass through these units. Typically, the amount of fermented liquid that is processed in one cycle of the present method equals at least 50 hl per square meter of surface area of the filter that is employed for filtering the slurry. More preferably, the aforementioned ratio is at least 100 hl/m², most preferably said ratio is in the range of 100-500 hl/m².

The present method offers the advantage that the PVPP particles can be recovered in the PVPP-enriched retentate in high yields. A yield of 80 wt. % is easily achieved, and even yields of more than 95 wt. % re feasible.

The filtration of the slurry in accordance with the present method preferably yields a PVPP-enriched retentate in which the weight ratio of PVPP particles to yeast is substantially higher than the same weight ratio in the PVPP-depleted filtrate. Accordingly, in a preferred embodiment the weight ratio of PVPP particles to yeast of the PVPP-enriched retentate is at least 3 times, more preferably at least 5 times higher than the same weight ratio of the PVPP-depleted filtrate.

During one cycle of the present method typically at least 0.2 kg of PVPP particles are recovered in the PVPP-enriched retentate per square meter of filter surface area that is employed for filtering the slurry. More preferably, the latter ratio is within the range of 0.5-30 kg/m², most preferably the ratio lies within the range of 1-10 kg/m².

Typically, the filtration of the slurry is completed in less than 2 hours, more preferably in less than 1 hours.

An essential element of the regeneration of the PVPP particles is the desorption of the polyphenols and/or proteins that are bound to the PVPP particles. Preferably, the polyphenols and/or proteins are desorbed from the PVPP particles by increasing the pH to at least 10.0, more preferably to at least 11.0.

The present method offers the advantage that it is possible to desorb the polyphenols and/or proteins from the PVPP particles during the filtration of the slurry by combining the slurry with a caustic aqueous liquid prior to or during the filtration to increase the pH of the combined liquids to at least 10.0, preferably to at least 11.0. Preferably, the slurry is combined with the caustic liquid prior to the filtration. Thus, separation of desorbed polyphenols and/or proteins from the PVPP particles is effectively achieved as the polyphenols and/or protein pass through the filter together with the yeast to end up in the PVPP-depleted filtrate. The regenerated PVPP particles end up in the PVPP-enriched retentate which may be further processed before being recirculated to step b. of the present method.

In an alternative embodiment, the polyphenols and/or proteins are desorbed after the filtration by rinsing the PVPP-enriched retentate with a caustic aqueous liquid having a pH of at least 10.0, preferably of at least 11.0. The rinsing is advantageously performed by passing rinsing liquid through the PVPP-enriched retentate while it is in contact with the filter that was used for filtering the slurry, and removing the rinsing liquid containing desorbed components through the filter.

In the aforementioned embodiments, following the use of the caustic aqueous liquid the PVPP-enriched retentate is advantageously rinsed with an acid aqueous liquid, followed by rinsing with water, before recirculating the regenerated PVPP-particles to step c. Also these rinsing actions are advantageously performed by passing the rinsing liquids through the PVPP-enriched retentate while it is in contact with the filter that was used for filtering the slurry, and removing the rinsing liquids through the filter.

In order to remove any residual yeast that is comprised in the PVPP-enriched retentate, it may be advantageous to reduce the yeast content of said retentate before, during or after desorption by subjecting the PVPP-enriched retentate to sedimentation separation and/or filtration. Preferably, the yeast content of the retentate is reduced by means of sedimentation separation.

The terminology "sedimentation separation" as used herein refers to a separation technique in which solid particles that are suspended in a liquid are separated on the basis of a difference in density. Sedimentation is the tendency for particles in suspension to settle out of the fluid in which they are entrained in response to gravity and/or centrifugal acceleration.

The PVPP-enriched retentate may suitably be subjected to different sedimentation separation techniques to separate yeast and PVPP particles. Examples of sedimentation separation techniques that may be employed include settling, flotation and separation in hydrocyclones; flotation and separation by hydrocyclones being preferred. Most preferably, the present method employs flotation to separate the residual yeast from the PVPP particles contained in the PVPP-enriched retentate. The term "settling" is used to refer to separation in which only gravitation force is used to perform the separation.

Flotation of particles is governed by the same force balances as sedimentation. Flotation can be used for solids classification when there is a mixture of particles of different density in suspension.

The inventors have found that flotation can advantageously be used to separate PVPP particles from yeast cells as the sedimentation velocity of yeast cells tends to be significantly higher than that of PVPP particles.

Hence, in accordance with a particularly preferred embodiment, the separation of the PVPP-enriched retentate into a yeast-enriched fraction and a PVPP-enriched fraction comprises passing a liquid comprising said retentate through a separation vessel in an upward flow and by separately removing a yeast enriched fraction and a PVPP enriched fraction containing the PVPP particles that are to be recirculated, said PVPP enriched fraction being removed downstream (and above) of where the yeast enriched fraction is removed. It will be understood that the term "separation vessel" as used herein should not be construed narrowly as the vessel may suitably take the shape of, for instance, a standing tube. Preferably, the upward flow is a laminar flow. In order to achieve effective separation of PVPP particles and yeast cells, it is preferred to pass the liquid containing the PVPP-enriched retentate through the separation vessel at a vertical flow rate of 0.01-10 mm/s, more preferably of 0.04-3 mm/s.

The sedimentation separation employed in the present method preferably yields a PVPP-enriched fraction in which the weight ratio of PVPP particles to yeast is substantially higher than the same weight ratio in the yeast-enriched fraction. Accordingly, in a preferred embodiment the weight ratio of PVPP particles to yeast of the PVPP-enriched fraction is at least 3 times, more preferably at least 5 times higher than the same weight ratio of the yeast-enriched fraction.

Likewise, the yeast concentration of the yeast-enriched fraction is at least 3 times, preferably at least 5 times higher than the same concentration in the PVPP-enriched fraction.

The present method may be carried out as a batch process, a semi-continuous process or a continuous process. Preferably, the process is carried out as batch process.

The method may be carried out by a device for preparing a yeast fermented beverage, said device comprising:
 a fermentation vessel 10 for fermenting wort with a biologically active yeast to produce a fermented liquid containing yeast, alcohol, polyphenols and protein, the fermentation vessel 10 comprising an inlet 11 for receiving wort and an outlet 13 for fermented liquid,
 a PVPP dosing device 60 for combining the fermented liquid with polyvinylpolypyrrolidone (PVPP) particles to bind at least a fraction of the polyphenols and/or the proteins contained in the fermented liquid to said PVPP particles,
 a filter device 20 arranged to receive the fermented liquid with the PVPP particles, the filter device 20 comprising an outlet 22 for outputting a slurry containing the PVPP particles separated from the fermented liquid by the filter device 20,
 a separation device 30 comprising an inlet 37 arranged to receive the slurry, the separation device 30 comprising a filter 38 having a pore size in the range of 0.1-80 µm to produce a PVPP-depleted filtrate and an PVPP-enriched retentate, the separation device further comprising a first outlet 31 for outputting the PVPP-depleted filtrate and a second outlet 32 for outputting the PVPP-enriched retentate,
 a caustic feed 40 for feeding a caustic liquid to the PVPP particles downstream of the filter device 20 to generate regenerated PVPP particles,
 a recirculation path 61 to recirculate the regenerated PVPP particles to the PVPP dosing device 60.

FIGS. 1-4 schematically depict different embodiments of such devices.

The fermentation vessel 10 comprises a suitable inlet 11 for receiving the wort.

The filter device 20 comprises an inlet 24 for receiving the fermented liquid from the outlet 13 of the fermentation vessel 10. The filter device 20 further comprises outlet 22 for outputting the slurry and a further outlet 21 for outputting clarified fermented liquid.

The PVPP dosing device 60 may be arranged to supply PVPP particles to the fermentation vessel 10 or to the outlet 13 of the fermentation vessel or to the filter device 20 directly. The PVPP dosing device 60 may comprise a PVPP supply conduit 61 for supplying PVPP particles to the appropriate location in the device.

The filter device 20 may be a membrane filter or a kieselguhr filter. The filter device 20 may comprise an inlet 24 that is arranged to receive fermented liquid from outlet 13. Outlet 22 of the filter device 20 may optionally comprise a buffer volume 23 to allow independent operation of the separation device 30.

The filter device 20 may be a membrane filter and wherein the slurry is obtained as the retentate from said membrane filtration. The membrane filter may have a pore-size in the range of 0.1-5 µm, preferably of 0.2-1 µm.

The caustic feed 40 may comprise a vessel 41 for holding the caustic liquid and an output 42 for supplying the caustic liquid from the vessel 41 to the outlet 22 or to the sedimentation separation device 30. Preferably, the caustic feed is a pumpable fluid, even more preferably an aqueous caustic liquid.

Figure 1:
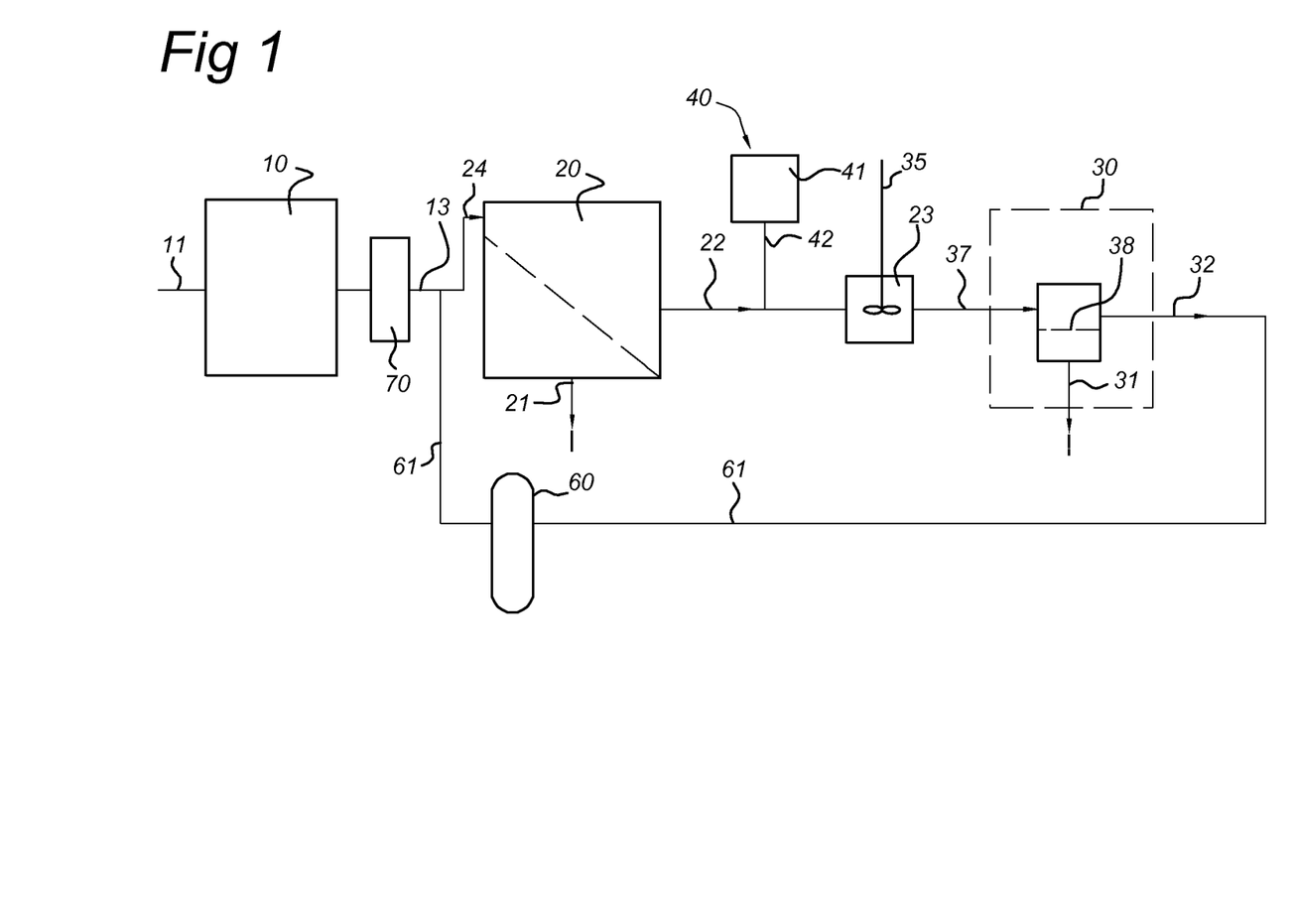
FIG. 1 schematically depicts an embodiment in which the device further comprises a sedimentation or centrifugation means 70 provided downstream of the fermentation vessel 10 and upstream of the combination the fermented liquid with the PVPP particles to remove yeast and other solids from the fermented liquid.

According to an embodiment, the device further comprises a sedimentation or centrifugation means 70 provided downstream of the fermentation vessel 10 and upstream of the combination the fermented liquid with the PVPP particles to remove yeast and other solids from the fermented liquid. An example of this is schematically depicted in FIG. 1.

Alternatively, the yeast may be removed by separation device 30, i.e. by filter 38 and possibly by a further sedimentation separator 130, described below with respect to FIG. 4.

The caustic feed 40 may be positioned on different positions, which will be explained in more detail below.

Figure 3:
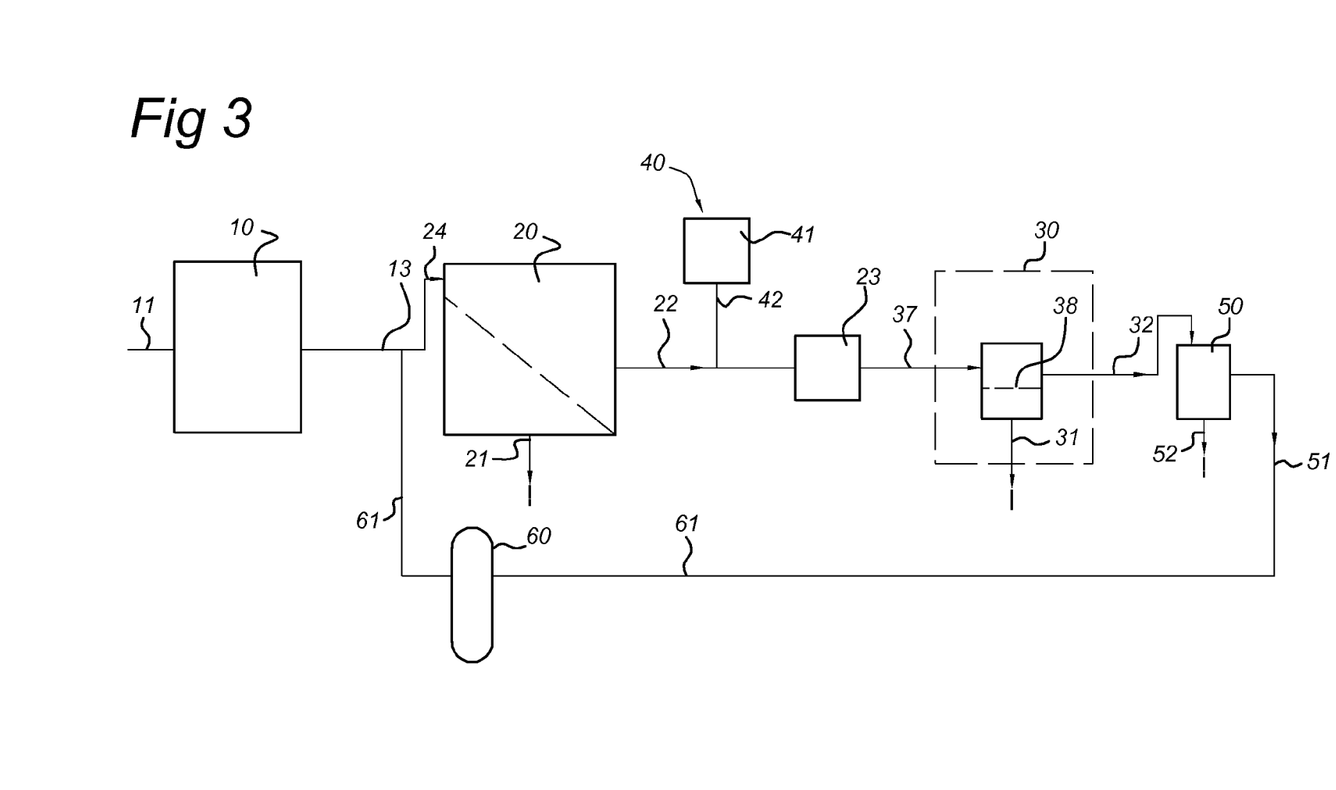
FIG. 3 schematically depicts an embodiment in which the further separation device 50 is provided downstream with respect to the caustic feed 40.

The caustic feed 40 may be provided upstream of the filter 38. The output of the caustic feed 40 may for instance be connected to the outlet 22 of the filter device 20. An example of this is shown in FIGS. 1, 3 and 4. The outlet 22 may further comprise a buffer volume 23 to allow independent operation of the separation process. Buffer volume 23 is however optional.

Optionally, stirring means 35 may be provided, preferably provided downstream of the caustic feed 40 and upstream of the sedimentation separation device 30, to promote thorough mixing of the filter retentate and the caustic liquid. The stirring means 35 may for instance be provided in the buffer volume 23 (as shown in the figures) but may also be provided in one of the conduits.

Figure 2:
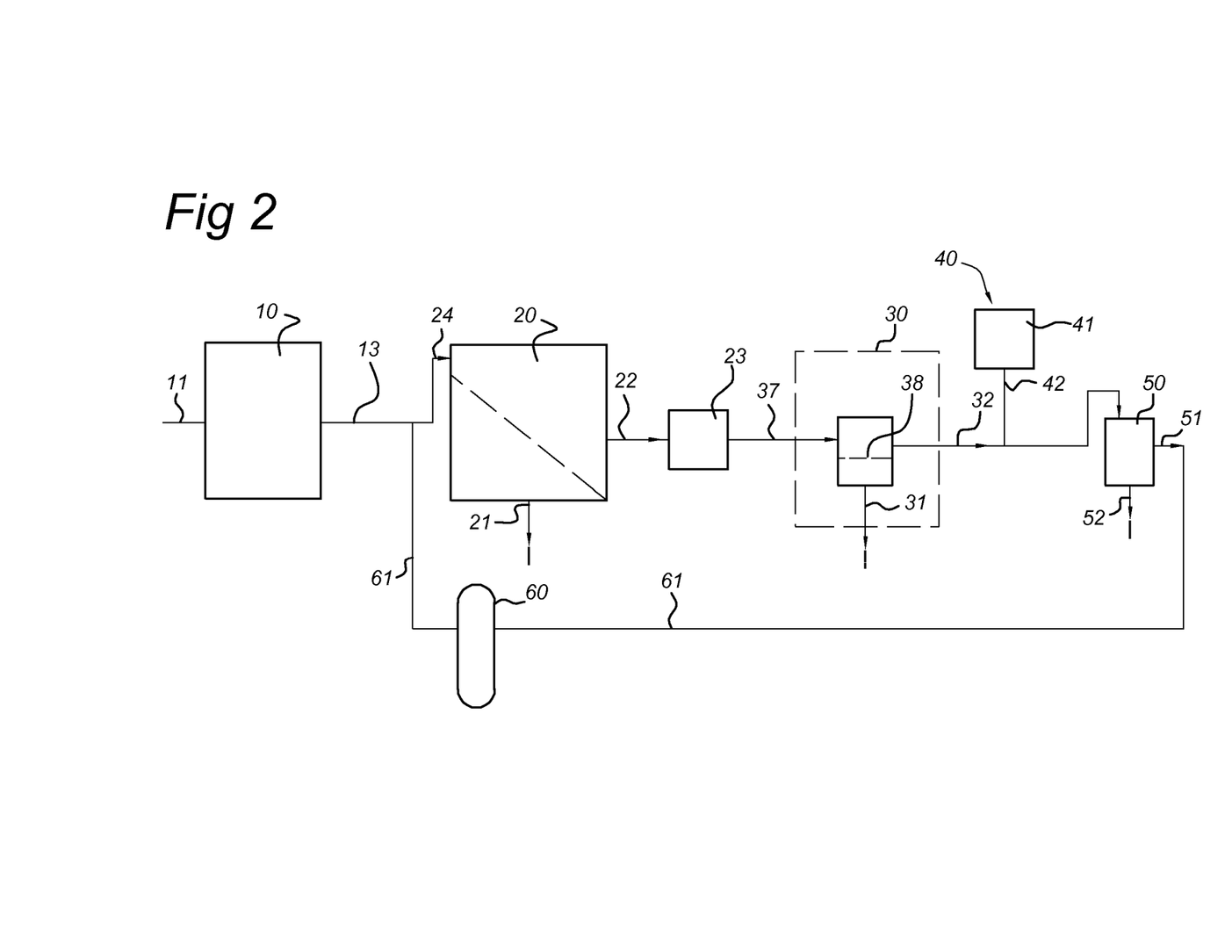
FIG. 2 schematically depicts an embodiment in which the caustic feed 40 is provided downstream of the separation device 30.

According to an alternative, shown in FIG. 2, the caustic feed 40 is provided downstream of the separation device 30. In that case, a further separation device 50 is provided downstream of the caustic feed 40 to receive the combined caustic liquid and PVPP particles from the separation device 30 to separate the desorbed polyphenols and/or the desorbed protein from the regenerated PVPP particles. The further separation device 50 (described in more detail below), may for instance comprise a filter or sieve. The PVPP-enriched retentate is passed over the filter or the sieve, said filter or sieve being permeable to the polyphenols and/or proteins but impermeable to the PVPP particles. Advantageously, the filter or sieve employed to separate desorbed polyphenols and/or proteins from the PVPP particles has a pore size in the range of 1-50 µm.

In accordance with an alternative embodiment, the separation of the desorbed polyphenols and/or proteins from the PVPP particles is achieved by providing one or more hydrocyclones as further separator 50 and passing the PVPP-enriched retentate through said one or more hydrocyclones. A hydrocyclone is a device to classify, separate or sort particles in a liquid suspension based on the densities of the particles.

Figure 5:
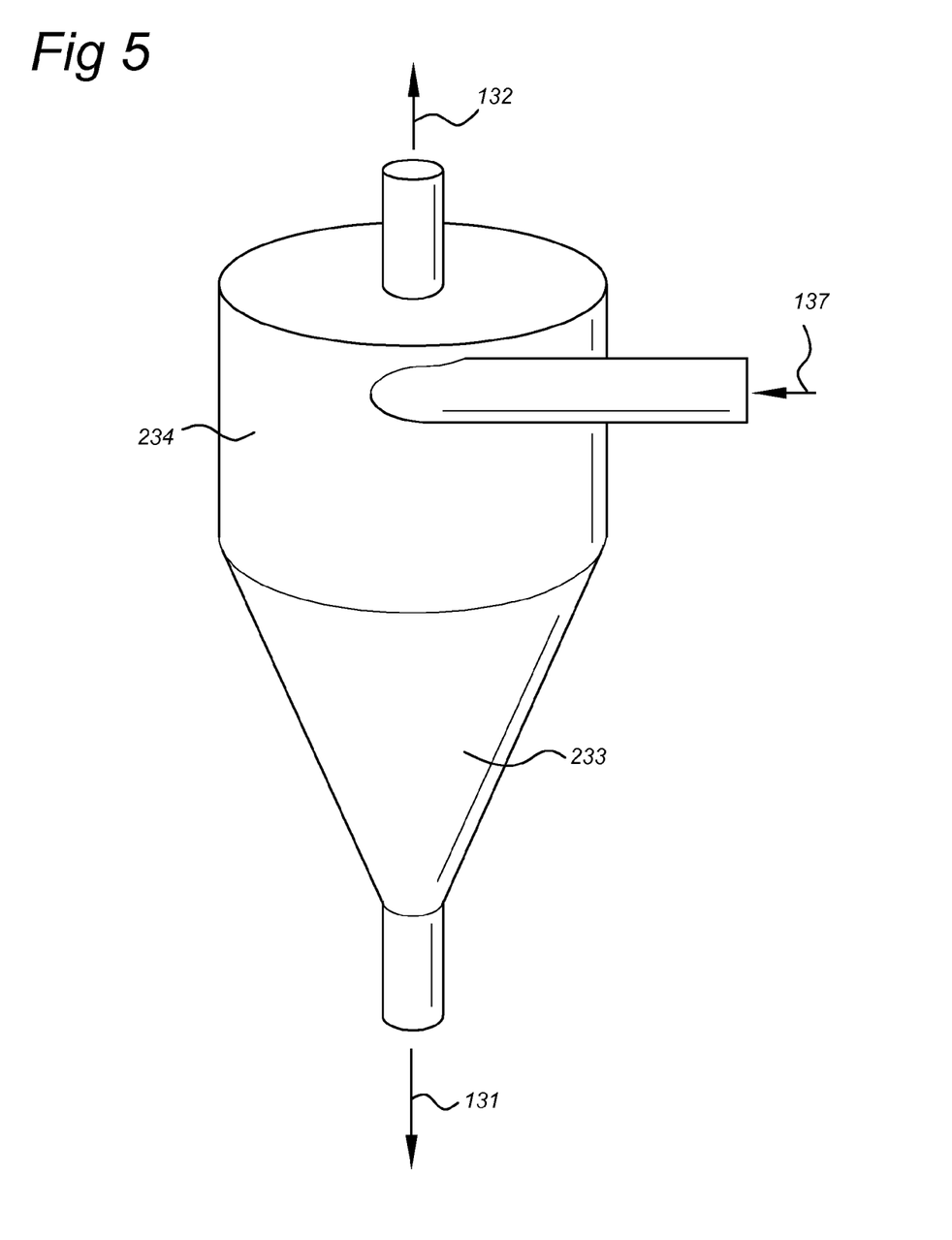
FIG. 5 schematically shows an example of a hydrocyclone.

Hydrocyclones normally have a cylindrical section at the top where liquid is being fed tangentially, and a conical base. A hydrocyclone has two exits on the axis: the smaller on the bottom (underflow or reject) and a larger at the top (overflow or accept). The underflow is generally the denser or thicker fraction, while the overflow is the lighter or more fluid fraction. An example of a hydrocyclone is schematically depicted in FIG. 5, although FIG. 5 is provided to show an alternative sedimentation separator 130.

In the present method, the underflow typically represents not more than 60 wt. % of the feed, more preferably said underflow represents 10-50 wt. % of the feed.

In a hydrocyclone the separation force is provided by a centrifugal force, possibly in combination with the gravitational force.

Again, optionally stirring means 35 may be provided downstream of the caustic feed 40 (not shown in FIG. 2).

As already mentioned, the device may further comprise a further separation device 50 provided downstream with respect to the caustic feed 40. The further separation device 50 may be arranged to receive the combined caustic liquid and PVPP particles from the separation device 30 to separate the desorbed polyphenols and/or the desorbed protein from the regenerated PVPP particles. The further separation device 50 is schematically depicted in FIGS. 2 and 3.

However, in case the caustic feed 40 is provided upstream with respect to the separation device 30 and the filter 38 of the separation device 30 has a pore size in the range of 1-50 µm, the further separation device 50 may be omitted as the filter 38 already ensures separation of the desorbed polyphenols and/or the desorbed protein from the regenerated PVPP particles. Examples of this are shown in FIGS. 1 and 4. The desorbed polyphenols and/or the desorbed protein will go through the filter 38 and exit the further separation device 30 via first outlet 31 as part of the PVPP-depleted filtrate.

In case the caustic feed 40 is provided downstream with respect to filter 38 and/or the caustic feed 40 is provided upstream with respect to filter 38 but filter 38 is not arranged to filter the desorbed polyphenols and/or the desorbed protein from the regenerated PVPP particles, the further separation device 50 may be provided.

Figure 4:
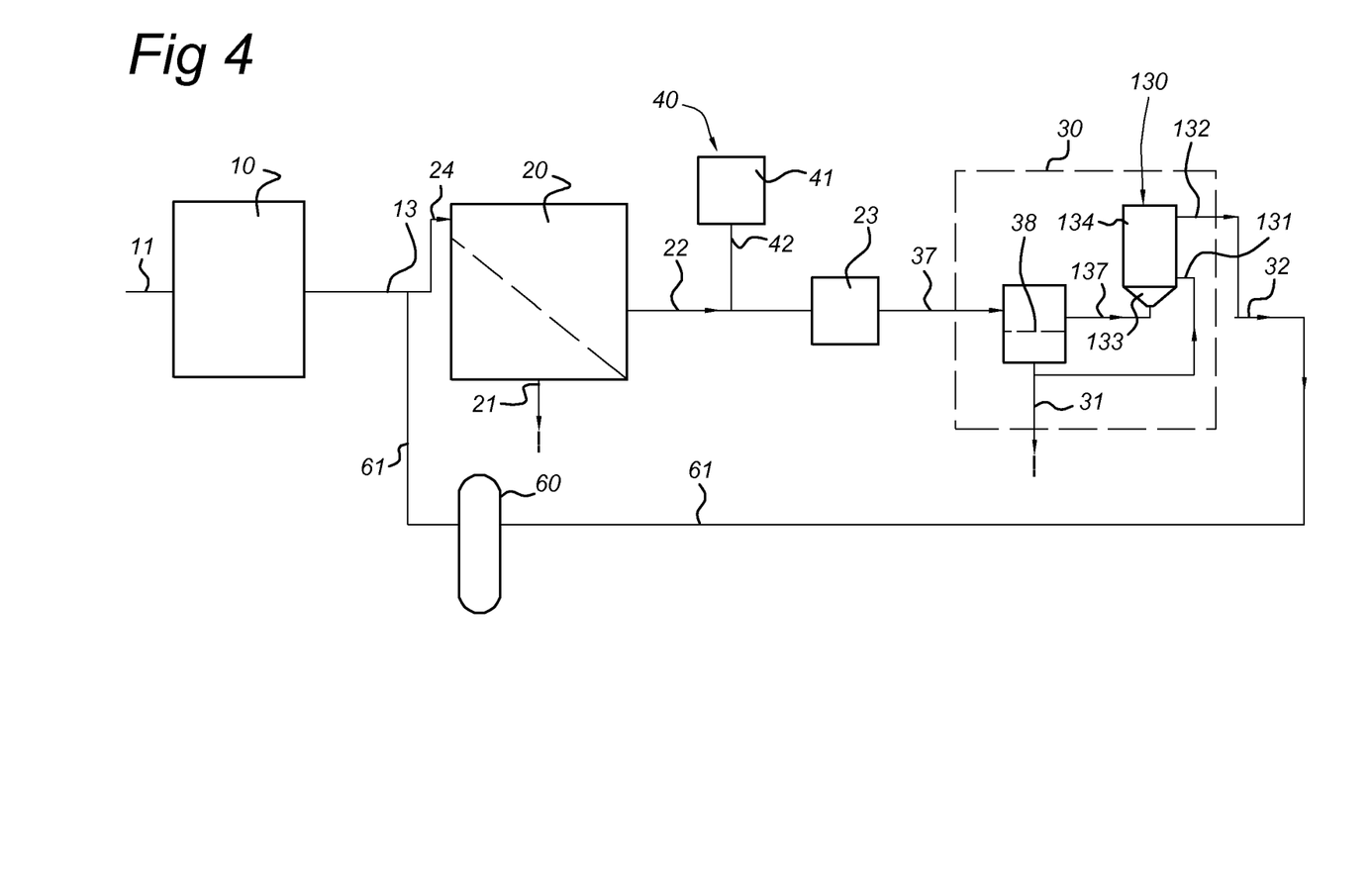
FIG. 4 schematically depicts an embodiment in which the separation device 30 may further comprise a sedimentation separator 130 arranged to receive the PVPP-enriched retentate from the filter 38 to remove residual yeast from the PVPP-enriched retentate and produce the PVPP-enriched fraction.

As schematically shown in FIG. 4, the separation device 30 may further comprise a sedimentation separator 130 arranged to receive the PVPP-enriched retentate from the filter 38 to remove residual yeast from the PVPP-enriched retentate and produce the PVPP-enriched fraction.

As already indicated above, the sedimentation separator 130 may be provided by a settling separator, a flotation separator or a hydrocyclone, FIG. 2 showing a flotation separator by way of example.

The term settling and settling separator is used to refer to separators in which only the gravitational force is used as separating force. A settling vessel (not shown) may be provided where the PVPP-enriched retentate may be put in, allowing residual yeast to settle at the bottom and obtaining a further enriched PVPP-enriched retentate from the liquid surface.

A flotation separator may be provided as sedimentation separator 130, comprising a separation vessel 131 arranged to pass a liquid (via inlet 137) comprising the PVPP-enriched retentate through the separation vessel 131 in an upward flow and remove a yeast enriched fraction (via output 131) and a further enriched PVPP retentate via output 132, said further enriched PVPP retentate being removed downstream (and above) of where the yeast enriched fraction is removed.

The outlet for yeast enriched fraction 131 may be situated above (downstream) or below (upstream) of inlet 137. In accordance with a preferred embodiment, the outlet for yeast enriched fraction 131 is situated above and downstream of inlet 137.

The flotation separation device 130 preferably comprises a conical lower section 133 and a cylindrical upper section 134. The inlet 137 is preferably connected to the lower end of the cylindrical upper section 134 or to the conical lower section 133. Even more preferably, the inlet 137 is connected to the conical lower section 133, most preferably to the bottom end of the conical lower section 133.

The outlet for yeast-enriched fraction 131 is suitably situated at the lower end of the cylindrical upper section 134 or in the conical lower section 133. More preferably, the outlet 131 is situated at the top of the conical lower section 133, in the lower end of the cylindrical upper section 134 or at the bottom end of the conical lower section 133. Most preferably, the outlet 131 is situated at the top of the conical lower section 133 or at the lower end of the cylindrical upper section 134.

The outlet for the further enriched PVPP retentate 132 is preferably situated at the top of the cylindrical upper section 134.

Alternatively, the sedimentation separator 130 is provided by a hydrocyclone. FIG. 5 schematically shows an example of a hydrocyclone. A hydrocyclone is a device to classify, separate or sort particles in a liquid suspension based on the densities of the particles.

The hydrocyclone depicted by way of example comprises a cylindrical section 234 at the top where liquid is being fed tangentially (in this case provided by inlet 137), and a conical base 233. A hydrocyclone has two exits on the axis: the smaller on the bottom (underflow or reject) being an outlet for yeast-enriched fraction 131 and a larger at the top (overflow or accept) being an outlet for PVPP-enriched retentate 132.

In a hydrocyclone the separation force is provided by a centrifugal force, possibly in combination with the gravitational force.

The invention is further illustrated by means of the following non-limiting example.

EXAMPLES

A freshly prepared slurry of regenerable PVPP particles (Divergan® RS, as supplied by BASF) was dosed into Heineken® unstabilised beer prior to membrane filtration (pore size 0.5 µm). After 3 hours and 45 minutes of filtration at 8 hl/hr on the membrane filter (with a filter area of 10 m2), the filter was drained and the used PVPP was collected.

The used PVPP (1 kg) was carried over into a small filter drum with an internal volume of 12 liter, which contained filter plates with 50 µm mesh size and about 0.1 m2 filter area. It was filtered at 1 hl/hr; subsequently the PVPP retentate was rinsed with a 2% NaOH solution at a temperature of 60° C. for 10 min at the same flow. Finally the PVPP retentate was flushed with acid and water steps. The colour of the filtrate turned brown almost immediately when the used PVPP and NaOH solution were combined.

Samples of fresh, unused PVPP slurry; used PVPP before flotation; and the PVPP samples taken from the flotation apparatus were taken to measure adsorption capacity.

Fresh PVPP had an adsorption capacity of 44%, as measured by a standard analysis in which a catechin solution is contacted with a defined quantity of PVPP and the reduction of catechin in this solution is taken as measure for the adsorption capacity. After filtration on the membrane filter an adsorption capacity of 14% was left. The regenerated PVPP had an adsorption capacity of 47%. 98% of the yeast present in the slurry was removed by the regeneration process on the filter.

Similar results can be obtained by single use grade PVPP, in combination with a smaller filter mesh size (<40 μm).

The invention claimed is:

1. A method of regenerating polyvinylpolypyrrolidone (PVPP) particles in preparing a yeast fermented beverage, comprising the following consecutive steps:
    (a) fermenting wort with a biologically active yeast to produce a fermented liquid containing yeast, alcohol, polyphenols and protein;
    (b) optionally removing part of the yeast from the fermented liquid;
    (c) combining the fermented liquid with polyvinylpolypyrrolidone (PVPP) particles to bind at least a fraction of the polyphenols and/or protein to said PVPP particles, wherein at least 80 wt. % of said PVPP particles have a diameter of 5-300 μm;
    (d) subjecting the combination of fermented liquid and PVPP particles to membrane filtration and removing a slurry containing the PVPP particles and yeast from the fermented liquid, said slurry being obtained as the retentate from the membrane filtration;
    (e) filtering the slurry containing the PVPP particles and yeast over a filter having a pore size between 0.1-80 μm to produce a PVPP-enriched retentate and a PVPP-depleted filtrate;
    (f) regenerating the PVPP particles contained in the PVPP-enriched retentate by desorbing polyphenols and/or protein from said PVPP-particles by rinsing said retentate with an aqueous caustic liquid having a pH of at least 10.0 and separating the desorbed polyphenols and/or the desorbed protein from the PVPP particles; and
    (g) after optional further refining of the regenerated PVPP particles, recirculating the regenerated PVPP particles to step (c).

2. The method according to claim 1, wherein the membrane filter has a pore-size in the range of 0.1-5 μm.

3. The method according to claim 2, wherein the membrane filter has a pore-size in the range of 0.2-1 μm.

4. The method according to claim 1, wherein the filter used for filtering the slurry has a pore size in the range of 1-50 μm.

5. The method according to claim 1, wherein at least 80 wt. % of the PVPP particles is recovered in the PVPP-enriched retentate.

6. The method according to claim 5, wherein at least 95 wt. % of the PVPP particles is recovered in the PVPP-enriched retentate.

7. The method according to claim 1, wherein at least 50 wt. % of the yeast contained in the slurry passes through the filter to end up in the PVPP-depleted filtrate.

8. The method according to claim 1, wherein the polyphenols and/or proteins are desorbed from the PVPP particles by increasing the pH to at least 10.0.

9. The method according to claim 1, wherein the polyphenols and/or proteins are desorbed from the PVPP particles by increasing the pH to at least 11.0.

10. The method according to claim 8, wherein the pH is increased to at least 10.0 prior to or during the filtration.

11. The method according to claim 1, wherein the aqueous caustic liquid has a pH of at least 11.0.

12. The method according to claim 1, wherein at least 0.2 kg of PVPP particles is recovered in the PVPP-enriched retentate per square meter of filter surface area that is employed for filtering the slurry.

13. The method according to claim 1, wherein the combining of the fermented liquid and the PVPP particles is achieved by mixing the fermented liquid with the PVPP particles.

14. The method according to claim 1, wherein the PVPP-particles are combined with the fermented liquid in a weight ratio of 1:100,000 to 1:100.

15. The method according to claim 14, wherein the PVPP-particles are combined with the fermented liquid in a weight ratio of 1:30,000 to 1:1000.

16. The method according to claim 1, wherein the removed slurry contains at least 0.5 g/l of the PVPP particles.

17. The method according to claim 1, wherein the removed slurry contains 1-200 g/l of the PVPP particles.

18. The method according to claim 1, wherein residual yeast is removed from the PVPP-enriched retentate by subjecting said retentate to sedimentation separation.

19. The method according to claim 18, wherein the sedimentation separation comprises passing a liquid comprising the PVPP-enriched retentate through a separation vessel in an upward flow and by separately removing a yeast enriched fraction and a PVPP enriched fraction, said PVPP enriched fraction being removed downstream and above of where the yeast enriched fraction is removed.

* * * * *